United States Patent [19]

Sutton

[11] 4,340,427
[45] Jul. 20, 1982

[54] WELL CEMENTING PROCESS AND GASIFIED CEMENTS USEFUL THEREIN

[75] Inventor: David L. Sutton, Duncan, Okla.

[73] Assignee: Halliburton Company, Duncan, Okla.

[21] Appl. No.: 126,613

[22] Filed: Mar. 3, 1980

Related U.S. Application Data

[62] Division of Ser. No. 38,022, May 10, 1979, Pat. No. 4,304,298.

[51] Int. Cl.$^3$ .............................................. C04B 1/00
[52] U.S. Cl. ........................................ 106/87; 106/88
[58] Field of Search .................. 106/87, 88, 86, 314, 106/290, 291

[56] References Cited

U.S. PATENT DOCUMENTS

| | | | |
|---|---|---|---|
| 2,635,052 | 4/1953 | Starnes | 106/87 |
| 3,197,323 | 7/1965 | Rehmar | 106/87 |
| 3,551,174 | 12/1970 | Hauskas et al. | 106/87 |
| 3,579,366 | 5/1971 | Rehmar | 106/87 |
| 3,591,394 | 7/1971 | Diggelmann et al. | 106/87 |
| 3,625,724 | 12/1971 | Alvero | 106/87 |
| 3,663,287 | 5/1972 | Mizunuma et al. | 106/87 |
| 3,709,707 | 1/1973 | Rehmar | 106/87 |
| 3,989,534 | 11/1976 | Plunguian et al. | 106/87 |
| 4,058,405 | 11/1977 | Snyder et al. | 106/87 |
| 4,119,476 | 10/1978 | Grishin | 106/87 |

*Primary Examiner*—James Poer
*Attorney, Agent, or Firm*—John H. Tregoning; G. Keith deBrucky

[57] ABSTRACT

A process for cementing adjacent a subterranean gas-containing zone, in which process a cement slurry containing a stabilized, dispersed gas is placed adjacent the zone. Sufficient gas is present in the cement slurry or is capable of being generated within the slurry to prevent the connate formation gas under pressure from passing into or around the cement prior to the time the cement has set up.

20 Claims, 2 Drawing Figures

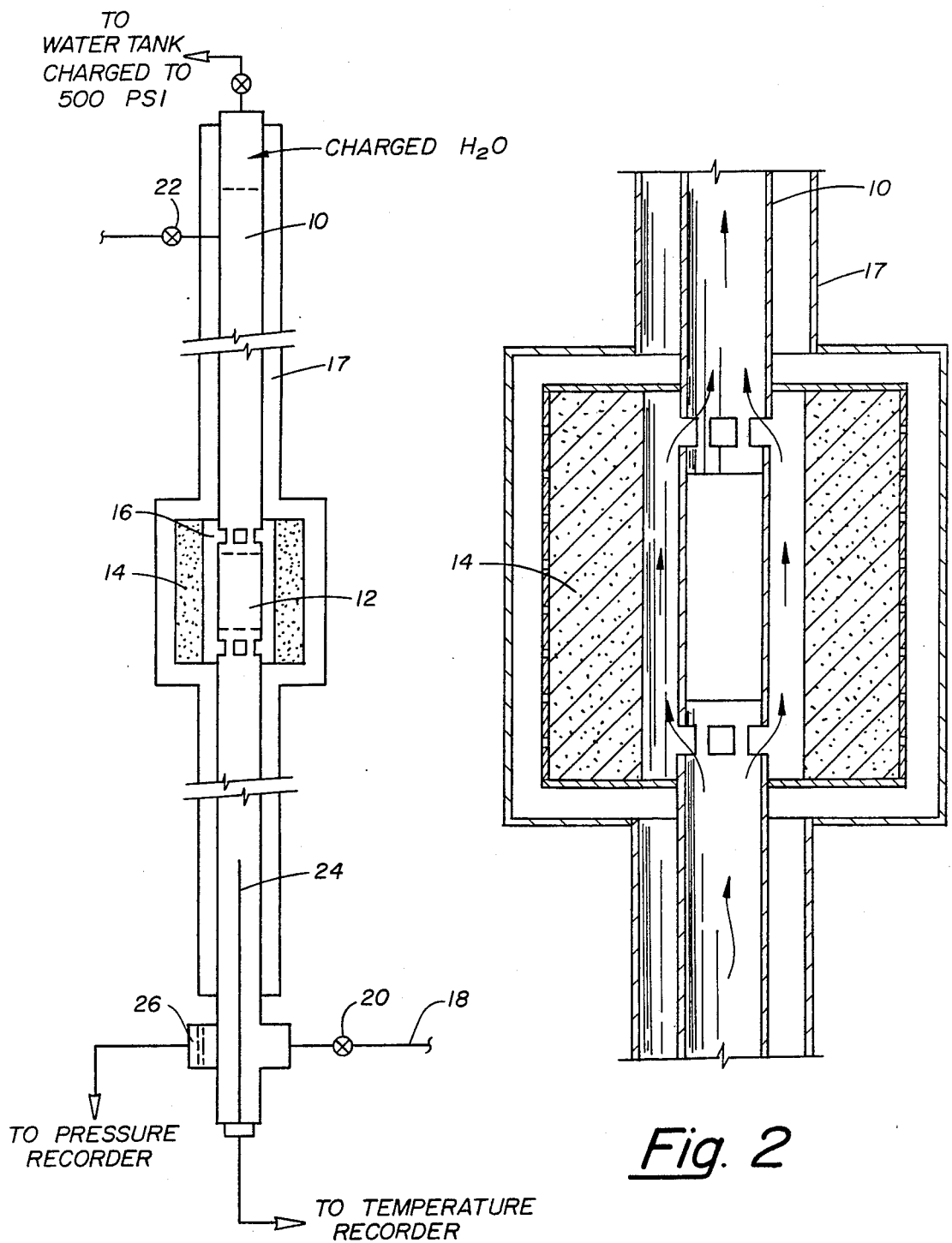

WELL CEMENTING PROCESS AND GASIFIED CEMENTS USEFUL THEREIN

This is a division, of application Ser. No. 038,022, filed May 10, 1979, U.S. Pat. No. 4,304,298.

The present invention relates to cement compositions, and more particularly to the use of special hydraulic cement compositions for sealing or cementing subterranean zones penetrated by a bore hole, such as cementing the annular space between an oil and/or gas well casing and the surrounding formation. In particular, the invention relates to an improved hydraulic cement slurry in which is entrained a stabilized and dispersed gas for cementing zones which contain gas under pressure, so that emission and flow of gas from the formation into the bore hole or well annulus is suppressed or controlled by the counteractive pressure resulting from the inclusion of gas in the cement slurry prior to the time that the cement composition sets to a hardened state.

In the production of hydrocarbons from a subterranean situs, the subterranean formations are typically cemented or sealed by pumping an aqueous hydraulic cement slurry into the annulus between the pipe and the formation. In the oft practiced placement of cement in the annular space between the casing of an oil well and the surrounding subterranean environment, the cement slurry is commonly pumped down inside the casing and back up the annular space outside the casing. Occasionally, the cement is introduced directly to the annular space at the outer side of the casing. Where the cement has been pumped down the casing initially, any cement slurry which remains in the casing is displaced into the annulus by a suitable fluid or fluids.

On some occasions, the zones adjacent the cement-containing annulus contain connate gas under substantial pressure. In these instances, an undesirable phenomenon referred to in the art as gas leakage is sometimes encountered in which formation gas enters the annular space which surrounds the well casing after the primary cementing slurry has been placed. This gas can migrate to the surface, or other subterranean zones, through the annulus and the cement, forming a permanent flow channel or a highly permeable cement, and the leakage of such gas continues even after the cement slurry has taken a final set. Such gas leakage is detrimental to the long-term integrity and sealing efficiency of the cement in the annulus, and the magnitude of such leakage is often enough to require an expensive remedial squeeze cementing job to be carried out to suppress or stop the gas leakage. Such gas leakage can cause high volume blow-outs shortly after cement placement and before the cement has initially set.

Gas leakage occurs even though the initial hydrostatic pressure throughout the column of cement slurry placed in the annulus far exceeds the pressure of gas in the formation from which the leaking gas originates. In explanation, it is theorized that two different well bore conditions can occur which will allow gas entry into the annulus:

(1) Partial setting, gellation or dehydration can occur at a specific or isolated portion of the cemented annulus. This can be due to partial dehydration, cement exposure to higher temperatures for longer periods of time, etc. This therefore prevents or restricts the transfer of hydrostatic pressure to the cement contained in the annulus below this point.

(2) The failure to transmit hydrostatic pressure can also occur when the entire cemented annulus is in the same state of physical dehydration and chemical hydration without the partial localized setting referred to in (1). In this situation, the cement has left the fluid state due to its hydration or gellation, but has not yet reached the solid state and therefore does not act or behave as true hydraulic system. When this point of hydration is reached, the cement column will not transmit hydrostatic pressure in the manner of a true fluid or liquid slurry. After this time, any reduction of volume due to fluid loss or shrinkage of the cement volume due to chemical hydration will cause pressure reduction within the annulus and the subsequent entry of gas.

Either of these conditions results in the hydrostatic pressure in some portion or all of the column being relieved, thereby allowing the gas to pass into the annular space and traverse the cement column.

Interestingly, the gelled or partially set cement, although it is incapable of maintaining or transmitting hydrostatic pressure still is not sufficiently rigid or set to prevent entry of gas into the annulus. According to most popular theories, an absolute volume reduction occurring after the cement column can no longer transmit pressure reduces the pore pressure in the still semi-plastic slurry. When the pore pressure falls below the formation gas pressure, formation gas leaks into the well bore. Two principal mechanisms which act to decrease pore pressure are the hydration reaction of cement and the loss of filtrate to the adjacent permeable formation.

Gas leakage problems have been noticed following casing cementing operations on surface conductor, intermediate, production and liner jobs. Gas returns to the surface have often been noticed within 1 to 7 hours after placement of the cement. Many times, however, the gas flow does not return to the surface, but flows into low pressure zones causing interzonal gas communication.

Several proposals to counteract undesirable gas leakage in oil and gas wells have been advanced. One proposal, not heretofore previously examined in detail to my knowledge, is to increase the density of the water used in mixing the cement slurry. Through tests which I have conducted, I am persuaded that the use of densified water does not function to effectively prevent the loss of hydrostatic pressure which is responsible for the ability of gas to pass into the annulus from the surrounding formation at a time when the slurry is undergoing chemical hydration.

Another undertaking to reduce or prevent gas leakage is based upon an appreciation of the role played by physical dehydration or chemical hydration in the slurry column as being partially responsible for the loss of ability to transmit hydrostatic pressure through the column of cement. To combat physical dehydration, and hopefully thus prevent gas entry into the annulus below the dehydrated section of the column, efforts have been made to use specially designed fluid loss additives in the slurry to reduce water loss, and thus curtail the deleterious dehydration. Exemplary of work which has been directed to the role of fluid loss in facilitating connate gas invasion, and the use of fluid loss additives in controlling fluid loss-related gas invasion are the paper "Filtrate Control—A Key in Successful Cementing Practices," Cook and Cunningham, Paper No. SPE 5898, Society of Petroleum Engineers of AIME, published in 1976 and the paper "Gas Leakage in Primary Cementing—A Field Study and Laboratory Investigation", Christian et al., Paper No. SPE 5517, Society of Petroleum Engineers of AIME, published in 1975. These efforts, however, while they have to some extent alleviated gas leakage where the problem is not severe, have not afforded a satisfactory solution in all instances.

The present invention is a process which eliminates or alleviates gas leakage to a cement-containing well bore from a subterranean formation by increasing the compressibility of the cement slurry under actual downhole conditions and prior to final setting of the cement. It has been determined that increasing the compressibility of the slurry by mixing it with a gas, and concurrently controlling fluid loss from the slurry after it is in place, reduces the amount of pressure drop caused by loss of fluid from the slurry to low pressure zones along the well bore, and also by internal volume reduction resulting from chemical hydration of the cement. In effect, the entrained gas, by virtue of its compressibility, reduces the magnitude of the pressure decrease resulting from slurry volume reduction. Thus, according to the invention, the increased compressibility of the slurry is achieved by including an effective amount of a stabilized, entrained or in situ generated gas in the slurry at a time immediately prior to, and during the initial stages of, chemical hydration of the cement.

It has previously been well known to use aluminum powder, and other gas generating chemicals, to develop lightweight or open-celled character in concrete, grouts and mortar formulations. This procedure has been employed, however, for the purpose of producing a lightweight product, or an expanded or open-celled, high permeability product for use at atmospheric or relatively low pressure conditions. In construction projects, for example, situations are often encountered where any significant shrinkage of the cement in the course of setting up cannot be tolerated due to resulting failure of structural bonds, or loss of necessary seal integrity. Gas-containing, shrink resistant cement mixtures have been proposed for use in such situations. There is, however, no known prior utilization of the internal gas entrainment for the purpose of substantially increasing the compressibility of an unset cementitious slurry under relatively high pressure conditions, coupled with fluid loss control, in order to compensate for an intolerable loss in volume or internal pore pressure sustained prior to or during the chemical hydration period of the composition.

In an investigation carried out by the U.S. Army Corps of Engineers and reported in their Technical Report No. 6-607, August, 1962, entitled "Investigation of Shrinkage Resistant Grout Mixtures," several types of grout slurries were mixed with from 0.01 to 0.1 weight percent finely divided aluminum powder. The expansion of these slurries upon curing at temperatures ranging from 50° F. to 100° F. and atmospheric pressure was observed. It was concluded that the gas generated by the included aluminum powder greatly reduced shrinkage in the final product.

Three U.S. Pat. Nos. 3,197,323; 3,579,366 and 3,709,707 issued to Rehmar disclose the use of aluminum metal particles in structural concrete compositions to offset contraction, and to oppose the normal tendency of grouts or concretes to settle. Rehmar proposed to coat the aluminum particles with various materials to prevent their undergoing surface oxidation prior to being placed in the cementing compositions.

Hauska et al. describe the use of specially prepared aluminum powders and pastes in the manufacture of foamed concrete in U.S. Pat. No. 3,551,174.

Babcock U.S. Pat. No. 3,890,157 discloses the use of gas absorbent materials, such as activated alumina and activated carbon, in cementitious mixtures for the purpose of releasing gas during setting to inhibit shrinkage. This patentee states that the use of aluminum particles for this purpose suffers from the disadvantage of requiring very careful control of the conditions of gas release.

The in situ generation of acetylene gas through the incorporation of protectively coated particles of calcium carbide in building cement compositions is proposed in Grieder U.S. Pat. No. 1,882,810.

In Sutton U.S. Pat. No. 3,979,217, it is proposed to fabricate lightweight cellular cement structural panels by including in the cement composition a foam stabilizer and air in amounts sufficient to lower the density of the cellular product to a desired level. For the purpose of permitting foam generating agents included in the composition to function effectively, certain other additives are excluded from the composition, among these being calcium chloride. In the preparation of the slurry which ultimately sets to the lightweight cellular panel, the cement slurry is mixed with a foam prepared by injecting air into a mixture of foam stabilizer and water.

In U.S. Pat. No. 4,119,476 to Grishin, after reviewing the state of the art entailing the use of aluminum powder to develop entrained gas in the manufacture of cellular concretes, the patentee proposes a method by which waste slag, yielded as a by-product of the aluminum manufacturing process, can be effectively and very economically employed as the gas generating agent in cellular concrete slurries. The patentee expresses concern for oxidation of the aluminum particles prior to their use, and proposes certain procedures, including grinding of the slag under an inert atmosphere, to prevent such oxidation. The cellular concretes produced by the process are described as being used for structural heat insulation purposes.

U.S. Pat. No. 3,551,174 discloses procedures for preparing water-dispersible aluminum pastes and powders for use as gas generating agents in the manufacture of foamed concretes. The aluminum pastes produced by the advocated procedures are alleged to have improved dispersibility and storage life.

In an article entitled "Admixtures for Concrete" appearing in the October, 1954 Journal of the American Concrete Institute, a discussion of gas-forming agents for use in concrete formulations to prevent shrinkage and settling refers to the use, inter alia, of aluminum powder which reacts with the hydroxides present in the hydrating cement to produce minute bubbles of hydrogen gas throughout the cement-water matrix. The authors indicate that the unpolished powder is preferred, although when a slower reaction and reduced rate of evolution of hydrogen is sought, the use of the polished form of the aluminum particles is advantageous. According to the authors, the amounts of aluminum added are usually limited to 0.005 to 0.02 percent by weight of the cement, although larger amounts are sometimes used in the production of lightweight concrete of low strength. It is further indicated that zinc and magnesium powders can also be used for the purpose of generating gas within the slurry. Hydrogen peroxide and bleaching powder can also be utilized to produce bubbles of oxygen instead of hydrogen. Nitrogen and chlorine are also contemplated as gases which can be incorporated in the matrix.

In an article entitled "Which Grout?" appearing in the publication Concrete Construction, October 1974 issue, at page 501, various known procedures for forming gas by chemical reaction of a finely ground material with water, or some other constituent of a grout, are described. Aluminum powder is indicated to be commonly used for this purpose, and it is further disclosed that more recently fluid coke has been used for the release of gas.

The effects of adding varying amounts of aluminum powder to a neat hydraulic cement are considered in the article "Expanding Cements for Primary Cementing," Carter et al., May 1966 Journal of Petroleum Technology.

The disclosures and teachings of the foregoing patents and publications are incorporated herein by reference for the understanding they impart as to the background technology from which the present invention progresses.

The adaptation of the foregoing previously recognized general procedures for gasifying cementitious mixtures to the combating of the gas leakage problem herein described and encountered in many oil and gas well cementing and completion operations is not readily apparent. Special corditions creating special requirements are encountered in the context of placement of a pumpable cement slurry in the annulus between the well casing and the well bore hole which are not concerns of the fabricator of structural concrete, or the user of grouts at surface use conditions of ambient temperature and atmospheric pressure. Particularly, no concern exists for the loss of water under pressure to adjacent permeable formations (physical dehydration). Moreover, generating a gas in a cement slurry located in a well annulus for the purpose of preventing external gas leakage into the annulus would appear to be inconsistent and self-defecting.

It has been determined, however, that the thorough dispersal of gas generated in situ or premixed with the slurry, coupled with control of bleed-off or water loss by the incorporation of a suitable fluid loss additive, produces a suitable compressible cement in which the gas is homogeneously dispersed and stabilized. This is contrary to the concentrated force of high pressure gas entering the annulus from an adjacent formation at a localized point as evidenced by the fact that in most cases, such gas may ultimately pass completely through the slurry and be emitted at the upper surface of the cement column.

My determination that gas entrainment by in situ generation, or by premixing, is effective in a well cementing composition to prevent gas leakage from the adjacent formation is based upon several conclusions as to the transition states undergone by the slurry as it sets up to the final cured condition, all now confirmed by tests and observations. I have confirmed that partial physical dehydration of the cement slurry at one location in the annulus allows no significant pressure transmittal through the slurry column to locations below the point of dehydration. Cement slurries undergoing normal chemical hydration do not continue to behave as a true fluid once they have commenced chemical hydration, insofar as is concerned their ability to transmit or maintain hydrostatic pressure over the length of the slurry column. As the hydration of the cement proceeds, the rate of water transmissibility within the column decreases. Further, even low fluid loss cement slurries nevertheless have some fluid leak-off, and mixtures of cement and water also decrease in slurry volume as a result of the chemical hydration reaction which itself decrease the volumetric water content. When permeable formation sections exist adjacent the hydrostatic column of slurry at some location therealong, the fluid losses to the formation, coupled with the water volume reduction due to the chemical hydration reaction, exceed the volume of water which is capable of being transmitted through the cement matrix in the hydrostatic column. A blockage is thus established which produces a decrease in the effective pore pressure within the cement, and this enables the unwanted formation gas to enter. Paradoxically, the gelled or partially hydrated cement, although it is incapable of maintaining hydrostatic pressure throughout the column, is still not sufficiently rigid nor of sufficient volume to prevent the entry of formation gas into the annulus once the hydrostatic pressure at the point of entry is less than the gas pressure in the adjacent zone.

Since the foregoing considerations point to the important role played by the compressibility of the slurry in maintaining internal hydrostatic pressure, it was concluded that the gas inclusion technique of the present invention should increase or maintain internal pore pressure within the slurry column, thus combating the primary or basic cause of undesirable gas leakage. Tests have confirmed that this theory is borne out in practice, and that compressibility can be increased by the inclusion of entrained, stabilized gas in the slurry at the time of emplacement and prior to final set.

Concerns based in possible detrimental side effects of such gas inclusion have been set to rest by determining appropriate processing conditions and formulation contents. Thus, a concern existed that the gas inclusion might cause an unacceptable increase in the permeability of the final set cement. It has been determined, however, that this presents no problem when the proper concentration of the gas is well dispersed in the slurry, and at least a minimum effective amount of a means which insures against excessive dehydration is utilized. Some concern also existed that excessive gas pressure developed within the slurry might be sufficient to cause collapse of the casing, or possibly to damage blow-out preventers or other well head equipment. Again, however, it has been determined that with proper control of the amount of gas developed in the slurry, sufficient pressure will not be developed to cause either of these undesirable results to occur.

It has been further determined that the gaseous cements of the invention develop very high strength bonds with the casing in contact with the set cement, and that the early compressive strength of such cements is improved relative to neat cement.

In arriving at the conclusions upon which the present invention is based, a number of tests have been conducted. In many of such tests, downhole cementing conditions have been simulated in a test cell of the type shown in the drawings in which:

FIG. 1 is a schematic illustration of the test cell.

FIG. 2 is an enlarged detail view, in section, of a permeable core used around the center of the test cell.

Basically and generally, the well cementing compositions of the invention include a hydraulic cement, water and an amount of gas effective to yield a stable and useful volume of dispersed gas under in-place temperature and pressure conditions encountered in the well, and to provide such stable and useful volume at least during the time between mixing and one-half hour before set time (compressive strength greater than 200 psi) of the cement under the conditions prevailing at the placement site. Both the gas and any material in the cement by which it is generated are compatible with the cement slurry in respect to its intended use and function. The principles of the invention are applicable not only to oil and/or gas wells, but also to water wells, and even to fluid conveyance pipelines laid in the earth.

When terms such as "set time" and other nomenclature conventionally employed in the oil well cementing technology are utilized, further clarification as to the connotations thereof is available from Bulletin 10-C of the American Petroleum Institute, which is incorporated herein by reference.

In the foregoing broad statement of the invention, stable volume is defined as the volume of gas at in-place conditions after the water phase is saturated with dissolved gas and any reactions between the generated gas and other slurry components are sufficiently complete that no significant reduction in gas volume occurs before set time. To result in a stable volume of gas, the generated or pre-incorporated gas must have limited solubility in the water phase of the cement slurry, and the gas must not liquefy at in-place temperature and pressure conditions.

A useful volume is defined as at least 0.10 SCF/CF of the slurry without gas, or the amount of gas needed to effect an in-place compressibility increase of at least 25% over the in-place compressibility of the slurry without gas.

Compatibility of the gas generating materials or the generated gas with the cement slurry is defined as causing no effect on the thickening time, consistency, fluid loss or compressive strength development of the cement slurry which cannot be corrected (sufficiently for the intended cement slurry application) by adding practical and economical amounts of chemical admixtures to the slurry.

Various methods of gas inclusion in the slurry can be utilized in practicing the process of the invention. Such methods broadly include (a) the addition of a gas to the slurry prior to or during pumping of the slurry into the well bore, and (b) the in situ chemical generation or release of the gas within the slurry. The latter method is preferred, and includes, for example, the incorporation of metals which will react with hydroxides contained in the cement slurry, or with water, the incorporation of chemicals which yield gas with elevation of temperature, the incorporation of substances which will absorb and later release substantial quantities of gas, and the incorporation of liquids which are converted to the gaseous state without chemical change after the slurry is in place and as a result of the high temperatures at the downhole situs of usage. In whatever system of gas inclusion is selected, it is preferable to utilize a system which is relatively inert to the chemical hydration reaction of the cement and does not substantially interfere with that reaction. Also gases which exhibit any significant degree of solubility in water are either inoperative, or less preferred than other gases which are substantially insoluble in water.

In the preferred method of forming the gas in situ in the cement, various materials can be utilized as the gas generating means. Metals which react with aqueous alkaline solutions or with water to yield hydrogen in accordance with the electromotive series order of reaction can be used, and of these Al, Ca, Zn, Mg, Li, Na, K, or mixtures of these metals, are preferred. Certain compounds which react to yield hydrogen or other gas can also be used. The most preferred gas generating material is powdered aluminum. Whatever material is utilized, however, it is incorporated in an amount which is adequate to increase the compressibility under downhole conditions by at least 25% in relation to the initial compressibility of the same slurry not containing the gas generating agent. To accomplish this, the slurry contains at least 0.1 SCF of stabilized entrained gas per cubic foot of slurry, with the amount of gas increasing with well depth. In terms of the actual downhole volumetric amount of gas included in the slurry, this will generally be from about 0.1 volume percent up to about 50 volume percent, with the actual amount depending upon the temperature and pressure conditions prevailing in the well, and to a lesser extent upon other additives which are used in the slurry.

For hydrogen and gases having PV characteristics similar to hydrogen, it is possible to estimate the amount of gas which must be included in the cement slurry in order to produce a 25% increase in compressibility over that which characterizes the slurry without included gas. Such estimation is accomplished using the equations:

$$\text{SCF/cubic ft. of slurry} = (0.1)\ P_h/2000)^{1.1428}$$

$$\text{Gas Volume Percent (Downhole Conditions)} = (0.1)(P_h/1750)^{2.144}$$

In the equations, $P_h$ is the pressure at the cementing locus, and the equations are based upon an assumed drop in $P_h$ of 10% and a neat slurry compressibility of $30(\mu v/v)/atm$.

In order to maintain hydrostatic pressure by in situ generation of gas within the slurry, or preliminary introduction of gas, it has been found to be very desirable to increase some form of fluid loss control means in the slurry, otherwise the gas volumes required to maintain hydrostatic pressure are excessive. In some instances, an agent should also be present for aiding in dispersing and stabilizing the generated gas.

Many materials are known which reduce the amount and rate of fluid loss from the slurry after it has been placed in the annulus. Other additives to oil well cements which are principally used for other reasons, such as retardation or as dispersing agents, also demonstrate, in some cases, some capacity for reducing fluid loss. A widely used measure of fluid loss from cement slurry is a standard API fluid loss test (API RP 10B, which is incorporated herein by reference), by which, under standard conditions, the amount of slurry filtrate which will pass through a standard screen of standard surface area in a given time is determined. The cement compositions of the present invention, when used in the process of this invention, are caused, either by the inclusion of an internal fluid loss control means, or by external conditions hereinafter described, to yield a fluid loss value of less than 1000 cc in 30 minutes under such API test conditions (325 mesh screen, 1000 psi) and at a temperature of 100° F. Preferably, the type and amount of additive used are such that not more than 850 cc of fluid are lost in such standard API test of the slurry at 100° F., and the most preferred slurries lose less than 500 cc under such testing conditions. Since occasionally, the stated limits of fluid loss may not be optimum in the case of some seldom used exotic cement mixtures, another useful measure of the tolerable fluid loss is a loss equivalent to not more than 75% of that which would characterize the neat blend of cement and water alone, and preferably not more than 50%.

With regard to the described fluid loss desiderata, it will be understood that the standard API fluid loss test conducted in the 325 mesh screen does not simulate several conditions which may exist in the actual bore hole. Two of these are:

(1) low permeability formations which are saturated with gas or oil or both. In this case the actual fluid loss from the slurry contained in the bore hole may be less than that measured by the standard fluid loss test. As the formation permeability decreases, the rate at which the fluid can be lost can be affected by the formation permeability based on Darcy's radial flow equation, and the effect of the fluid and/or gas contained in the zone; and (2) the mud cake deposited during drilling operations may not be totally removed during the cementing operation, and thus limits filtrate loss from the cement slurry.

It is therefore possible in some cases that satisfactory fluid loss control of the slurry can be achieved by extrinsic conditions existing in the bore hole prior to and during the cementing operation. Since these conditions are not completely determinable with certainty, fluid loss additives may be used when in fact the well conditions provide sufficient filtrate limitations. In some wells, based on past experience, it may be known that such conditions do exist, and therefore the control of filtrate loss need not necessarily be provided by the addition of special fluid loss control chemicals.

Any fluid loss mechanism which adequately limits cement filtrate loss in accordance with the criteria described above is suitable for use in the process of the invention, provided it is compatible in the sense hereinbefore defined. Some well known types of fluid loss additives are cellulose derivatives, such as hydroxymethylhydroxyethyl cellulose and hydroxyethyl cellulose, lignin, ligno-sulfonates, polyacrylamides, modified polysaccharides, polyaromatic sulfonates and guar gum derivatives or mixtures of two or more of the foregoing. A preferred fluid loss material used in the cement composition is a commercially available blend or mixture of a cellulose derivative or modified polysaccharide with a dispersant constituted by a polymeric aromatic sulfonate. In general, where chemical additives are used to provide the necessary fluid loss reduction, an amount of from about 0.05 to about 3.0 weight percent based on cement is used.

When a chemical powder is utilized as the source of gas generated in the cement slurry, the amount of powder which is required in order to yield a specified volume percent of gas in the slurry increases with pressure, since the compressibility resulting from a specified percent gas volume developed within the slurry decreases with increasing pressure. Thus, for example, only 0.62 weight percent of aluminum is required to produce 5 percent by volume of hydrogen gas in a typical slurry in the case of an API casing schedule of 6000 feet, and this amount of gas will, at that depth, yield a compressibility of 183.2 ($\mu$v/v)/atm., whereas 1.10 weight percent aluminum is required in the case of a 14,000 foot API casing schedule to produce the same volumetric amount of gas in the slurry and, under those conditions, the compressibility of the slurry is only 62.5 ($\mu$v/v)/atm. These comparisons are based upon the use of a neat slurry having an initial compressibility of 28 ($\mu$v/v)/atm.

The amount of gas which will be generated under given temperature and pressure conditions by a predetermined amount of aluminum powder can be predicted with considerable accuracy. From this, the increase in compressibility which will be attained can be precalculated. Thus, for example, under 10,000 foot API casing conditions, 1% aluminum added to a relatively standard Portland cement containing a fluid loss additive can be predicted to yield a compressibility of at least 1000 ($\mu$v/v)/atm.

Where gas such as air, methane, ethane or nitrogen is mixed with the slurry prior to or during pumping the slurry into place, the volumetric proportion of gas placed in the slurry is dependent upon the temperature and pressure conditions prevailing at the cementing locus. Preferably, the equivalent of at least 1% by volume of gas, under placement conditions, is intermixed in the slurry prior to pumping where this method of gas entrainment is utilized.

When using aluminum, in order to prevent premature gellation of the slurry which decreases the capability of the slurry to transmit hydrostatic pressure, it may be necessary with some slurries to include a small amount of an alkaline earth metal halide, and preferably calcium chloride. This in turn sometimes required the inclusion in the slurry of a retarder to offset an accelerating effect of the alkaline earth metal halide and slightly retard the thickening time.

The rate of gas generation depends largely upon the particle size and shape or reactive area of the aluminum powder utilized. It has also been determined that it is desirable, contrary to some indications to be found in the prior art, to permit a relatively thin oxide layer to exist on the surface of the aluminum particles, rather than for the particles to be bright and clean. This delays the gas-forming reaction to permit the cement slurry to be circulated through the casing and up into the annulus prior to the time that any substantial amount of gas generation has occurred. It is also possible to use a chemical inhibitor coated on the surface of the gas generating agent to alter the initial reaction, or the reaction rate.

On the other hand, although it is permissible in the practice of the invention to select aluminum powder particle sizes and the additives for the slurry so that reaction of the aluminum powder does not commence until the slurry is in place, and is not finished until the onset of initial set, it is usually preferred to use an aluminum powder fine enough to assure substantially complete reaction within about one-half hour after the slurry has been pumped into place, with the most of the gas being produced after the slurry has been pumped into place, rather than prior to that time.

It is sometimes desirable to use a blend of aluminum powders which includes a portion of relatively fine particles and a portion of relatively larger particles. In this way, the action of gas generator is extended over a longer time, and the ability to maintain pore or hydrostatic pressure over such extended period can be realized from such blends, where a more rapidly reacting fine powder alone, while functioning very effectively during the initial period following placement, tends, in some instances, to lose its efficiency long prior to the approach of a highly retarded cement to final set.

The rate of reaction and gas generation from aluminum powder has been determined to be proportional to the temperature, with faster reaction rates occurring as the temperature increases. Further, the reaction rates of gas generating powders can generally also be affected by the particular additives in the cement slurry. For example, some conventional retarders and fluid loss additives slow the reaction rate, while calcium chloride, salt, or a combination of salt and sodium thiosulfate, have been found to accelerate the rate of reaction in most cases.

It should be noted that the heat of the gas generating reaction of the aluminum powder is relatively high, and for this reason, care must be exercised that retarders are included in the slurry as necessary to prevent the thickening time from being unacceptably altered in response to the change of temperature occurring upon reaction of the aluminum. In further regard to the exothermal heat of reaction of aluminum, it should also be mentioned that another reason for the effectiveness of the aluminum powder in combating the problem of gas leakage into the well bore is that the rate of decrease in pore pressure, as previously described, increases as the temperature within the slurry decreases and, conversely, is reduced as the temperature within the slurry column is elevated. Therefore, the relatively high heat of reaction which is developed as the aluminum particles undergo reaction with alkaline materials in the slurry increases thermal expansion within the column, and for this reason decreases the rate of pore pressure reduction, in addition to increasing the compressibility of the slurry as previously described. The same aid is, of course, derived from other gas generating chemicals which are exothermic in their reactions with slurry components.

In order to determine the period and rate of gas generation which is desirable, it is preferable to initially determine, prior to actual placement of the cement, the initial set time of the cement slurry to be gas treated in accordance with the present invention. This can be determined by the analysis of the temperature profile of the slurry. Such tests are preferably conducted with roughly equivalent amounts of gas generating additive incorporated in the slurry as will be used in the final composition to be placed in the annulus, since the heat of reaction of the gas generating agent can tend to accelerate the initial set time of the slurry over that which would be characteristic of the neat mixture.

Several methods of incorporating the aluminum particles in the cement composition can be utilized. Thus, aluminum powder can be dry blended with the other solid components of the slurry prior to the addition of water thereto, or liquid additive systems of water and aluminum powder can initially be made up and then added to the cement to form the final slurry composition. A preferred procedure involves dispersing aluminum powder in a polyhydric alcohol or other water-compatible organic carrier and then ultimately mixing the alcohol-aluminum solution with water prior to adding the water to the remaining slurry components. The alcohol carrier for the aluminum powder preferably has incorporated therein a small amount of wetting agent. The use of an alcohol carrier for the aluminum has been found to enable such mixtures to be stored over an extended period of time without adverse effect, and without settling or scumming of the aluminum particles, thus providing an advantage over water-aluminum liquid additive systems.

It should be pointed out that when considering in situ gas generation in general, the chemical source of the gas can take various chemical and physical forms. Thus, metal pastes can be homogeneously mixed into the slurry. Particles may be protectively coated with a slowly dissolving film. Pairs of chemical reactants can be utilized which interact with each other to yield the required gas, rather than reacting with any inherently present component of the slurry or a chemical yielded during curing.

Based on the foregoing considerations, when the preferred aluminum type gas generator is utilized, and it is added in powdered form, the amount of powder added can vary from about 0.02 weight percent in the general case of relatively shallow wells, up to about 5 weight percent in the general case of deep wells of up to 30,000 feet. For most usages, the amount of aluminum powder used will range from about 0.1 to about 2 percent by weight of the dry cement. The size of the aluminum particles utilized will be determined from the factors previously described, but in general, a relatively fine aluminum powder typically having a particle size distribution similar to that shown for Types B, C and D in Table II is preferred for most wells, with the coarseness of the particles usually being slightly increased as the depth of the well increases.

Cementitious compositions constituted in accordance with the present invention for use in the process described herein generally include a hydraulic inorganic cement, water present in an amount in the range of from about 20 to about 135 percent by weight of the dry cement, and preferably from about 35 to 50 percent, a fluid loss material present in an amount in the range of from about 0.05 to about 3.0 percent by weight of dry cement, and from about 0.1 to about 15 percent by volume of a well dispersed, stabilized gas. Where in situ gas generation is used, the cement can also contain calcium chloride or other inorganic accelerator compound which functions to prevent premature gellation of the cement. Calcium chloride, when used, is present in an amount of from about 0.1 to about 3 percent by weight of dry cement, with 2 weight percent being preferred.

Portland cement is generally preferred because of its low cost, availability and general utility, but other cements such as pozzolan cements, gypsum cements, and high alumina content cements can be utilized in the invention. Portland cements of API Classes H and G are the most preferred cements for use in the invention in most instances, although the other API classes of cement can also be utilized. The characteristics of these cements are described in API Specification 10-A, which is incorporated herein by reference. A highly useful and effective slurry base composition for use in practicing the invention utilizes API Class H cement mixed with water to provide a density of from 10 to 20 pounds per gallon.

The water used in the cement composition can be water from any source, provided that it should not contain an excess of organic compounds, or salts which may affect the stability of the cement composition.

Where the practice of the invention is carried out by whipping in, or admixing, gas with the slurry at the time of mixing the slurry (as opposed to in situ generation of the gas), a suitable foam stabilizer is preferably included in the composition. These can include organic surface active agents and inorganic particulate lamellar foam stabilizers. The amount of foam stabilizer used will typically range from about 0.15 to about 2.5 percent by weight of dry cement. Generally, the selection of such additives will be within the skill of those knowledgeable in the oil well cement technology.

In yet another mode of practicing the invention, materials which are liquids at ambient temperature at the surface, but which become gaseous at the temperatures prevailing at the locus of placement of the cement, can be utilized by pre-mixing with the slurry prior to placement. Such materials include, for example, propane and butane. Also, acetylene dissolved in acetone under pressure may be mixed with pressurized slurry at the surface, and will be later evolved as free gas at downhole temperatures.

Other types of well known and conventional additives can be incorporated in the slurry to modify the properties of the final set cement, and to alter the set times and curing rates of the slurry. Such additives include, inter alia, viscosifiers or dispersants and weight adjusting materials.

Additional dispersing agents can be utilized to facilitate using lower quantities of water and to promote higher set cement strength. Friction reducers which promote freer movement of the unset composition, and allow ease of pumping through the annulus, can be incorporated in the slurry in amounts up to about 2.0 percent by weight of dry cement. Some dual function additives, such as lignosulfonates which function both as a dispersant and also as a set time retarder, can be incorporated in the slurry where their use would be advantageous for certain cementing situations.

Accelerations, such as the soluble inorganic salts in addition to calcium chloride, can be utilized up to about 8 percent by weight of dry cement. Retarders, where utilized, are generally used in amounts of from about 0.1 weight percent up to about 5.0 percent by weight of dry cement.

Of the various types of fine aggregate or particulate filler materials which can be used, fly ash, silica flour, fine sand, diatomacious earth, lightweight aggregate and hollow spheres can be cited as typical. The use of these materials is well understood in the art, and so long as they are compatible with the stability of the essential gas component of the compositions of the invention, they can be employed over wide ranges of concentration.

As previously indicated, some of the foregoing conventional additives possess the capability of preventing unacceptably high fluid loss from the slurry during the curing period.

A preferred composition of the invention includes API Class H Portland cement, water in an amount of from about 35 to 50 percent by weight of cement, a fluid loss material present in an amount of about 1 percent by weight of cement, calcium chloride present in an amount of 2 percent by weight of cement, and relatively fine aluminum powder in an amount of from about 0.1 to about 1.5 weight percent. This composition, with selective variation only in the quantity and size of aluminum particles included, is very effective for primary cementing in wells ranging from a depth of about 100 feet to about 20,000 feet. As previously explained, the amount and reactive rate of aluminum powder employed in the composition will be varied in correspondence to the depth of the well in which the slurry is to be used.

In order to further illustrate the process of the invention, and some of the novel gasified compressible cements used in its practice, the following examples are given. In all of the examples, expressions of weight percent are based on the weight of the dry cement.

EXAMPLE 1

In a first group of tests, API Class H hydraulic cement is batch mixed with water and various additives. Various types of commercially available aluminum powders are included in each of the test slurries. The slurries are then placed in a test cell of the type illustrated in FIG. 1. The test cell is an elongated tubular member 10 having a 2-inch inside diameter and having a slotted or perforated central section 12. A permeable core collar 14 saturated with water is secured around the slotted central section 12 of the tubular member 10 to define a simulated annulus 16 therewith. The entire test cell assembly is surrounded by a water jacket 17 to provide elevated uniform temperatures.

A cement fill line 18 is connected to the bottom of the test cell via a cement fill valve 20 to permit the cement slurry to be placed in the tubular test cell. The test cell is filled until cement slurry reaches the cement vent valve 22 at the top of the test cell. After the slurry has been placed in the cell, the test cell is closed in and pressure is applied to the top of the cell by water delivered from a tank in which pressure is developed by nitrogen at a pressure of 500 psi. Pressure applied at the top of the cell enables simulation of the hydrostatic pressure of the cement column in an actual well.

Three foot-long thermocouples 24 are inserted in the cement column from the bottom to measure temperature profiles in the slurry. Temperature measurements are used to detect the initial set of the slurry. Pressure at the bottom of the test cell is transmitted across a rubber diaphram 26 and measured by means of a pressure recorder. Pressure at the bottom of the test cell and temperature are measured periodically during each test over a period of at least twelve hours.

The results of the tests are set forth in Table I. In all of the slurries except for that utilized in Test 12, 48 weight percent fresh water is used, based on the weight of the dry cement. In Test 12, 51 weight percent sea water is employed. In each test except Test 12, the cement and water are mixed at 15.5 lb/gal. with a yield of 1.2 ft.³/sack.

In all of the tests except Tests 8 and 9, 2 weight percent calcium chloride is utilized in the slurries to prevent premature gellation. No calcium chloride is incorporated in the slurries used in Tests 8 and 9.

Specific identification of the type of aluminum powder used, by particle size characteristics, is set forth in Table II. In all of the tests carried out in the test cell, the aluminum-containing slurry compositions which are utilized each contain 0.25 weight percent of the metal, based on weight of the dry cement. In Tests 1-7, the aluminum powder is dry blended with the cement slurry. In Tests 8-13, the aluminum powder is first mixed with water containing a small amount of wetting agent, and in Tests 14 and 15, the aluminum powder is mixed in ethylene glycol as a carrier fluid.

In the case of Tests 7 and 10-15, the temperature kicks indicative of initial set of the slurries are not clearly defined, and therefore initial set times cannot be determined.

TABLE I

| Test No. | Additives[a,b] Fluid[c] Loss | Dispersant[d] | Al[e] | Retarder[f] | Initial Set Hrs:Min | $P_{Max}$ PSI | Time to Reach $P_{Max}$ Hrs:Min | Time to Return to 500 PSI Hrs:Min | Time to Return to 400 PSI Hrs:Min | Time to Return to 300 PSI Hrs:Min | Temp. of Test, °F. |
|---|---|---|---|---|---|---|---|---|---|---|---|
| 1 | 1% X | — | A | — | 2:30 | 550 | 0:22 | 1:00 | 1:12 | 4:42 | 145 |
| 2 | 1% X | — | A | — | 6:00 | 520 | 0:10 | 1:00 | 1:24 | 7:48 | 80 |
| 3 | 1% X | — | C | — | 3:30 | 690 | 1:00 | 9:15 | 12:12 | 15:00 | 145 |
| 4 | 1% X | — | D | — | 1:45 | 780 | 1:45 | 3:00 | 3:12 | 3:24 | 145 |
| 5 | 1% X | — | 50-50 of C & D | — | 3:20 | 725 | 1:10 | 4:00 | 4:48 | 5:20 | 145 |
| 6 | 1% X | — | E | — | 1:40 | 720 | 1:10 | 3:40 | 5:20 | >12:00 | 145 |
| 7 | 1% X | — | D | — | — | 965 | 3:10 | 9:00 | 9:30 | 10:30 | 145 |
| 8 | 1% X | — | C | — | 1:50 | 590 | 2:10 | 4:30 | 5:55 | 7:20 | 138 |
| 9 | 0.75% Y | — | C | — | Test failed after 20 minutes due to premature gellation. | | | | | | |
| 10 | 0.75% Y | 0.5% | C | — | — | 620 | 0:30 | 3:30 | >12:00 | >12:00 | 138 |
| 11 | 1% Y | 0.25% | C | — | — | 785 | 1:05 | >18:35 | >19:00 | >19:00 | 138 |
| 12 | 1% Y | 0.75% | C | — | — | 590 | 0:40 | 5:30 | 18:00 | 18:10 | 138 |
| 13 | 0.75% X | 0.25% | B | 0.25% | — | 770 | 6:12 | 11:00 | 12:46 | 13:30 | 138 |
| 14 | 0.75% X | 0.5% | B | 0.30% | — | 775 | 5:00 | >13:35 | >12:00 | >12:00 | 138 |
| 15 | 0.75% X | 0.5% | B | 0.25% | — | 1085 | 19:05 | >29:00 | >29:00 | >29:00 | 138 |

[a] All amounts expressed as weight percent based on weight of cement.
[b] All slurries include 2 weight percent $CaCl_2$ except in Tests 8 and 9 where slurries contain no $CaCl_2$.
[c] Fluid loss material X is a commercially available copolymer; fluid loss material Y is a commercially available blend of a modified polysaccharide and a polymerized, aromatic sulfonate.
[d] The dispersant used is a polymerized aromatic sulfonate.
[e] The particle size of the several aluminum powders used is set forth in Table II.
[f] The retarder used is a commercially available modified lignin.

TABLE II

Aluminum Powder - Particle Size Analysis[a]

| Type of Aluminum Powder | Maximum Particle Diameter (μm) for Percent Mass Shown[b] | | | | | | | | | |
|---|---|---|---|---|---|---|---|---|---|---|
| | 100% | 98% | 95% | 90% | 75% | 50% | 25% | 10% | 5% | 1% |
| A[c] | 2000 | 1500 | 1100 | 870 | 660 | 480 | 310 | 180 | 125 | 70 |
| B | 50 | 30 | 23 | 17 | 10 | 8.1 | 7.4 | 4.2 | 2.4 | 1.4 |
| C | 20 | 16.5 | 12 | 8.8 | 6.0 | 4.3 | 3.65 | 3.2 | 2.7 | 1.1 |
| D | 33 | 23 | 20 | 18 | 15 | 12.5 | 11.7 | 8 | 5 | 2 |
| E | 130 | 100 | 74 | 61 | 44 | 28.5 | 17 | 10.5 | 7 | 2 |
| F | 44 | 26 | 15.5 | 11.8 | 9.6 | 8.2 | 6.9 | 4.8 | 3.2 | 1.6 |
| G | 120 | 85 | 58 | 48 | 36.5 | 29.5 | 22 | 16.7 | 14 | 11 |
| H | 110 | 90 | 66 | 48 | 37 | 29 | 20.5 | 14 | 10 | 5 |

[a] From X-Ray Attenuation Method on ultrasonically dispersed samples (except for Type A).
[b] Percent shown in column heading "passes" diameter shown in table.
NOTE:

| μm Diameter | U.S. Sieve Size |
|---|---|
| 44 | 325 |
| 74 | 200 |
| 149 | 100 |

[c] Type A, data from sieve analysis.

In referring to Table I, it will be noted that the relatively coarse aluminum powder utilized in Test 1 does not react fast enough to maintain initial simulated hydrostatic pressure within the column until the initial set time occurring at 2½ hours after start of the test. It should be noted, however, that cement slurries are generally placed in the well annulus so as to have an initial hydrostatic pressure which is greater than the drilling mud used to drill the hole. For this reason, the initial hydrostatic pressure will often exceed the pressure of the potentially invasive connate gas by a substantial margin, and therefore some decrease in hydrostatic pressure can be tolerated, so long as the hydrostatic pressure remains above that of the formation gas.

When the finer aluminum powder, Type C, employed in Test 3 is utilized, the overall effectiveness of the powder is very good, with a pressure increase up to 690 psi being developed in the first hour. Further, the pressure does not fall back to below the initial 500 psi at the start of the test until after 9 hours. In this case, the set of the slurry is determined to occur at 3½ hours.

Test 8 is the first of two slurries tested which do not contain calcium chloride. By comparison with Test 3, in which the same slurry containing calcium chloride is utilized, it can be perceived that the overall effectiveness of this slurry is improved by the addition of the calcium chloride. In the case of Test 3, the time required for the pressure to fall below 500 psi in 9 hours, whereas the same slurry without calcium chloride maintains pressure above the initial hydrostatic pressure for only 4½ hours.

Test 12 is carried out to determine if slurries can be mixed utilizing sea water in order to adapt them to application in offshore locations. A relatively large amount of friction reducer-dispersant compound is used in the slurry in order to control the extremely high viscosities which are encountered when mixing the slurry. The results of this test are considered moderately successful, with the maximum pressure of 590 psi attained, and the pressure holding above 500 psi for a period of 5½ hours.

In Test 15, initial hydrostatic pressure imposed by the pressurized water at the top of the slurry column is increased to 1000 psi in order to simulate conditions in the cementing of deeper wells. Because of this higher pressure, the pressure increase observed during gas generation is small compared with the other tests run at an initial hydrostatic pressure of 500 psi. Results of the test are nevertheless considered good since the pressure is maintained above 1000 psi for over 29 hours.

EXAMPLE 2

In the test cell depicted in FIG. 1, a test is carried out on a cement slurry made up by entraining nitrogen gas therein at the time of mixing. The composition of the slurry includes API Class H cement, 53 weight percent water based on the weight of dry cement, 0.75 weight percent of a commercially available modified polyacrylamide fluid loss additive, 2.0 weight percent calcium chloride, 2.0 weight percent of a commercially available sulfate ester surfactant, and 0.5 weight percent of a commercially available foam stabilizer. During the process of mixing the slurry, sufficient nitrogen is injected into the slurry to give approximately 10 percent by volume of gas in the slurry under the initial hydrostatic pressure condition of 500 psi.

After transfer to the test cell and application of hydrostatic pressure, the maximum pressure obtained is 550 psi one hour after the test is started. The pressure remains above the 500 psi level for 2 hours and 45 minutes. The set is determined to occur in 1 hour and 50 minutes. The test is considered successful.

EXAMPLE 3

For purposes of comparison, a commercially available expanding cement which is a Portland cement containing anhydrous calcium sulfoaluminate is mixed with 46 weight percent water, 2 weight percent calcium chloride, 1 weight percent of a commercially available polyacrylamide fluid loss additive and 0.25 weight percent of a commercially available modified lignin functioning as a retarder. The slurry as thus constituted is tested in the test cell illustrated in FIGS. 1 and 2 with an initial pressure of 500 psi imposed in the manner previously described. The slurry fails to transmit pressure to the lower end of the column after 10 minutes.

EXAMPLE 4

A slurry constituted identically to that described in Example 3 except for the inclusion of 64 weight percent water therein is tested in the previously described test cell, imposing 500 psi pressure on the slurry column at its upper end. After 15 minutes, the pressure is observed to fall off very rapidly to 120 psi. Example 3 and this example demonstrate that the expansion properties of a commercially available expanding cement effectuate no improvement in the ability of the slurry to transmit hydrostatic pressure.

EXAMPLE 5

In another series of tests, using variously adapted tubular test cells, gas volumes and slurry compressibilities are determined in the course of the reaction of various types of aluminum powders incorporated in the tested slurries in various concentrations. In these tests, high pressure and high temperature well conditions are simulated, with temperatures ranging from 140° F. to 230° F. and pressures from 2000 psi to 9500 psi. In all of the tests, API Class H cement is utilized, and is mixed with 46 percent water by weight of cement. Each slurry includes 1 weight percent, based on the weight of the cement, of a commercially available fluid loss additive constituting a blend of a modified polysaccharide and a polyaromatic sulfonate.

The compressibilities, gas volumes and rates of reaction measurements obtained in these tests are set forth in Table III.

TABLE III

| Test No. | Test Conditions °F. | PSI | Aluminum Powder Type[a] | Percent | Maximum Compressibility[b] | Gas Volume (%) Theory[c] | Calculated[d] Total | Before I.S.[f] | Aluminum Reaction (%) Total[e] | Before I.S.[f] | Comparative Rate |
|---|---|---|---|---|---|---|---|---|---|---|---|
| 1 | 150 | 2000 | G | 0.143 | 27 | 2.0 | nil | nil | nil | nil | Very Slow |
| 2 | 145 | 2000 | F | 0.143 | 115 | 2.0 | 1.65 | 0.80 | 83 NC | 40 | Mod. Fast |
| 3 | 145 | 2000 | F | 0.572 | 580 | 8.0 | 8.4 | 8.4 | 100 | 100 | Fast |
| 4 | 145 | 2000 | G | 0.572 | 63 | 8.0 | 2.9 | nil | 36 NC | nil | Very Slow |
| 5 | 145 | 2000 | H | 0.572[g] | 230 | 8.0 | 3.1 | 0.72 | 39 NC | 9 | Mod. Slow |
| 6 | 225 | 2000 | G | 0.572 | 620 | 8.9 | 8.6 | 4.27 | 97 NC | 48 | Moderate |
| 7 | 145 | 2000 | F | 0.43 | 490 | 6.0 | 5.6 | 5.6 | 93 | 93 | Moderate |
| 8 | 140 | 2000 | C | 0.43 | 404 | 6.0 | 5.8 | 5.8 | 97 | 97 | Very Fast |
| 9 | 174 | 9500 | D | 1.6 | 88 | 5.0 | 5.7 | 5.7 | 100 | 100 | Fast |
| 10 | 173 | 9500 | D | 1.6 | 82 | 5.0 | 5.0 | 5.0 | 100 | 100 | Fast |

[a]See Table II for particle size details.
[b]Maximum Compressibility, $\mu$/atm = $\mu(dv/v)$/atm.
[c]Amount of gas by volume of slurry theoretically generated by the aluminum-cement reaction.
[d]Gas volume calculated from measured compressibility.
[e]Total amount of aluminum reacting during test period from calculated gas volume "C". NC = Reaction not complete at end of test.
[f]I.S. = Initial Set Time.
[g]3% Salt and 0.5% $Na_2S_2O_3$ added to the base slurry for aluminum reaction acceleration.

The results set forth in Table III show that when the reaction of the aluminum is complete prior to initial set of the cement (as in Tests 3 and 8–10), the gas volumes calculated from measured maximum compressibilities are essentially equal to the theoretical gas volume calculated from the amount of aluminum used. For one percent aluminum powder, compressibilities up to 100 ($\mu v/v$)/atm. should be easily realizable for 10,000 foot API casing conditions. The data also show the compressibility for a given amount of aluminum used increases proportionally to decrease in pressure. Moreover, the finer aluminum particles are noted to react much faster than the coarser aluminum, and the reaction rate increases as the temperature increases.

After the completion of the tests, the test chambers are disassembled to examine the set plugs. There is no evidence of gas separation occurring in any of the tests.

EXAMPLE 6

A series of tests are run upon API Class H cement slurries containing several different types of aluminum powder in an amount of 0.143 percent by weight of cement. In each test, the slurry is allowed to react under atmospheric pressure by placing 50 cc of the test slurry in a 250 cc graduated cylinder. Two different temperature conditions—140° F. and 200° F.—are used in the tests. The percent of increase in the total volume of the slurry is measured at periodic time intervals during the reaction to determine the gas generating effect of the aluminum powders. In each case, a theoretical slurry volumetric increase of 270% is assumed for complete reaction of the amount of aluminum powder added, assuming no foam break-out. The results of these tests are set forth in Table IV.

incorporated in the slurry used in Test 31 reacts fairly rapidly, showing a 177% expansion in only 10 minutes. When a coarse aluminum of the sort referred to as Type G, and characterized in Table II, is used in the same slurry, an expansion of only 5% occurs in 10 minutes under the same temperature condition as shown in Test 6. This type of aluminum particle is obviously better suited for use in cement which is implaced relatively slowly and has a relatively long set time.

TABLE IV

Base Slurries: N: Class H; 0.38 H$_2$O/cement
H: Class H + 1.0% fluid loss additive$^a$; 0.46 H$_2$O/cement

| Test No. | Base Slurry | Al Type | Other Additives Percent and Type | Percent Volume Increase at Minutes Shown | | | | | |
|---|---|---|---|---|---|---|---|---|---|
| | | | | 5 Min. | 10 Min. | 20 Min. | 40 Min. | 60 Min. | 0 Min. |
| Test Temperature : 140° F. | | | | | | | | | |
| 1 | N | F | None | 101 | 108 | 117 | N.D.$^c$ | N.D. | 167 |
| 2 | N | G | None | 5 | 33 | 80 | F.B.$^d$ | F.B. | F.B. |
| 3 | N | F | 1.0 CaCl$_2$ | 36 | 85 | 103 | 120 | 120 | 120 |
| 4 | N | G | 1.0 CaCl$_2$ | 2 | 32 | 85 | 96 | 99 | 103 |
| 5 | H | F | None | 23 | 81 | 98 | 107 | 113 | 124 |
| 6 | H | G | None | 2 | 5 | 6 | 7 | 6 | 6 |
| 7 | H | F | 1.0 CaCl$_2$ | 23 | 73 | 127 | 153 | 167 | 170 |
| 8 | H | G | 1.0 CaCl$_2$ | 4 | 9 | 19 | 26 | 31 | 33 |
| 9 | N | F | 3.0 NaCl | 50 | 119 | 148 | 153 | 153 | 154 |
| 10 | N | G | 3.0 NaCl | 20 | 42 | 47 | 73 | 83 | 90 |
| 11 | H | F | 3.0 NaCl | 40 | 92 | 127 | 161 | 177 | 185 |
| 12 | H | G | 3.0 NaCl | 8 | 16 | 50 | 75 | 65 | 21 |
| 13 | N | F | 1.0 NaNO$_3$ | 40 | 52 | 95 | 97 | N.D. | N.D. |
| 14 | N | G | 1.0 NaNO$_3$ | 7 | 13 | 24 | 39 | N.D. | N.D. |
| 15 | H | F(PM)$^b$ | 3.0 NaCl | 68 | 145 | F.B. | 154 | N.D. | N.D. |
| 16 | H | F(PM) | 3.0 NaCl | 40 | 75 | F.B. | 36 | N.D. | N.D. |
| 17 | H | G(PC) | 3.0 NaCl | 10 | 19 | 31 | 36 | N.D. | N.D. |
| 18 | H | H | 1.0 CaCl$_3$ | 1 | 5 | 9 | 14 | 16 | 20 |
| 19 | H | G | 0.5 Na$_2$S$_2$O$_3$ | 3 | 7 | 11 | 17 | 24 | 30 |
| 20 | H | G | 3.0 NaCl + 0.5 Na$_2$S$_2$O$_3$ | 26 | 41 | 60 | 74 | 83 | 96 |
| 21 | H | G | 2.0 Na$_2$S$_2$O$_3$ | 19 | 38 | 44 | 54 | 61 | 63 |
| 22 | H | G | 1.0 CaCl$_2$ + 0.5 Na$_2$S$_2$O$_3$ | 24 | F.B. | 14 | 32 | 34 | N.D. |
| 23 | N | G | 2.0 NaCl + 0.5 Na$_2$S$_2$O$_3$ | 2 | 6 | 16 | 34 | 61 | N.D. |
| 24 | H | G | 1.0 NaCl + 1.0 Na$_2$S$_2$O$_3$ | 7 | 13 | 14 | 20 | 31 | N.D. |
| 25 | H | G | 3.0 NaCl + 1.0 Na$_2$S$_2$O$_3$ | 2 | 3 | 6 | 20 | 24 | N.D. |
| 26 | H | G | 3.0 NaCl + 0.25 Na$_2$S$_2$O$_3$ | 6 | 10 | F.B. | 34 | 41 | N.D. |
| 27 | H | G | 1.0 CaCl$_2$ + 1.0 Na$_2$S$_2$O$_3$ | 20 | 36 | F.B. | 60 | 68 | N.D. |
| 28 | H | G | 1.0 CaCl$_2$ + 0.25 Na$_2$S$_2$O$_3$ | 24 | 36 | F.B. | 66 | 73 | N.D. |
| 29 | H | D | None | Nil | Nil | 4 | 5 | 7 | — |
| 30 | H | E | None | Nil | Nil | Nil | 6 | 9 | — |
| 31 | H | C | None | 99 | 177 | 201 | 204 | 204 | — |
| 32 | H | A | None | 7 | 15 | 15 | 15 | 15 | — |
| Test Temperature: 200° F. | | | | | | | | | |
| 33 | H | D | None | 73 | 148 | 148 | 148 | 148 | — |
| 34 | H | E | None | 25 | 51 | 60 | 60 | 60 | — |
| 35 | H | C | None | 193 | 193 | 190 | 190 | 190 | — |
| 36 | H | A | None | 15 | 17 | 20 | 20 | 20 | — |

$^a$A commercially available fluid loss additive comprising a blend of cellulose derivatives and a polyaromatic sulfonate.
$^b$PM indicates premixed in mixing water; PC indicates precleaned with dilute HCl.
$^c$N.D. = Not determined
$^d$F.B. = Obvious foam breaking out.

From the results set forth in Table IV, it will be perceived that cement additives incorporated in the slurry which contain the aluminum powder affect the aluminum powder reaction rate in a manner similar to their normal effect on slurry thickening time. Thus, the fluid loss additive here used functions also as a retarder in most cement formulations, and here has the effect of slowing the reaction time of the aluminum. Calcium chloride, salt and a combination of salt and sodium thiosulfate accelerate the reaction.

The atmospheric expansion test results tabulated in Table IV also show that the relatively fine aluminum The atmospheric expansion tests also show that temperature very substantially affects the rate of reaction of the aluminum powder. Thus, in Test 29, a slurry containing Type D aluminum powder, as characterized in Table II, shows a 10 minute expansion of 0 percent of 140° F., but expanded by 148% at 200° F. as indicated in Test 33.

EXAMPLE 7

Using the conventional test cell procedure described in referring to the test alluded to in Example 1, tests are conducted on two slurries which differ by the inclusion of a moderate amount of fluid loss additive in one of the slurries, and no fluid loss additive in the other slurry. Each of the slurries contains API Class H cement, 40% water, 2% calcium chloride, and 0.25% of aluminum powder of the type referred to as Type C in Table II. The tests are run with a low permeability core around the center of the test cell, with 500 psi pressure applied to the top of the test cell, and using a bath temperature of 140° F. In the test of the slurry containing no fluid loss additive, pressure is continually bled off at the bottom of the test cell by the use of a water column at a rate of about 10 cc per minute. The bottom pressure is recorded continuously throughout the test.

The second slurry contains 0.5% of a commercially available water loss additive. The same test conditions are utilized in testing this slurry except that pressure is bled off from the bottom of the test cell at a rate of 2 cc of water per minute.

In the case of the slurry which contains no water loss additive, the bottom pressure drops to 218 psi after 92 minutes. In the case of the slurry containing a moderate amount of fluid loss additive, the pressure at the bottom of the column stays above 500 psi for 55 minutes; above 400 psi for 2 hours and 40 minutes and above 300 psi for 4 hours and 20 minutes.

EXAMPLE 8

A series of tests of cement slurries are conducted utilizing the test cell referred to in Example 1 and shown in FIGS. 1 and 2. Two different sizes of aluminum powder are utilized in the slurries, these being Types B and C as referred to in Table II. Several types of commercially available fluid loss additives are included in the slurry compositions, and in two of the tested slurries, different types of cement are utilized. The results of these tests are tabulated in Table V.

In these tests, the temperature of the slurry, the pressure applied to the top of the slurry column and the bottom pressure are measured periodically over a period of at least 12 hours. The normal and prevalent conditions of testing are considered to be the application of an initial or base pressure of 500 psi to the top of the column, the utilization of a low permeability core surrounding the central portion of the column, and the utilization of no pressure bleed-off from the bottom of the column during the test. In Tests 2 and 4, however, 1000 psi initial or base pressure is imposed on the top of the cement column instead of 500 psi. In Test 6, the method of gas incorporation in the slurry is by injection of carbon dioxide into the slurry at the time of mixing.

TABLE V

| Test No. | Slurry Composition[a] | Maximum Pressure PSI | Time to[b] Reach Maximum Pressure | Time for Pressure Back to Base Pressure | Time for Pressure 100 PSI Below Base | Time for Pressure 200 PSI Below Base |
|---|---|---|---|---|---|---|
| 1 | Class H + 48% H$_2$O + .25% Al C + 1% fluid loss additive | 560 | 0:25 | 1:25 | 4:35 | 11:00 |
| 2 | Class H + 48% H$_2$O + .25% Al C + 1% fluid loss additive | 1510 | 0:36 | 4:00 | 11:00 | — |
| 3 | Class H + 48% H$_2$O + .25% Al B + 1% fluid loss adddtive | 535 | 1:09 | 4:24 | 5:24 | — |
| 4 | Class H + 48% H$_2$O + .25% Al B + 1% fluid loss additive | 1265 | 0:25 | 4:00 | 5:05 | 6:55 |
| 5 | Class A + 72% H$_2$O + 4% Bentonite + 23 lbs/sk Gilsonite + .38% Al C + 2% fluid loss additive | 775 | 0:10 | 2:20 | 5:50 | 7:55 |
| 6 | Class H + 52% H$_2$O + 2% Howco suds[c] + .5% Carbo Wax[d] + CO$_2$ + 0.75% fluid loss additive | 510 | 0:01 | — | 0:29 | 0:31 |
| 7 | Cement Fondu + 40% H$_2$O + .25% Al C + .25% fluid loss additive | 777 | 13:20 | 18:30 | — | — |

[a]All of the slurries except those utilized in Tests 5 and 6 contain 0.25 weight percent of a commercially available polymerized aromatic sulfonate dispersant (of the type disclosed in U.S. Pat. Nos. 3,358,225 and 3,359,225, incorporated herein by reference), and all of the slurries except those utilized in Tests 5 and 7 contain 2.0 weight percent calcium chloride.
[b]All times recorded in Hours:Minutes.
[c]A commercially available surfactant
[d]A commercially available polyethylene oxide compound The results of Tests 1 through 4 demonstrate that there is no great difference in the gas generating effectiveness of the two types of aluminum powders employed in the slurries tested. The difference in particle size between the two relatively fine aluminum powders employed in the tested slurries is therefore deemed to be of relatively little significance.

Test 5 is a test of a high water ratio cement slurry. The results of this test indicate that high water content in the slurry does not deleteriously affect pressure maintenance.

The slurry tested in Test 6 contains surface active agent in order to stabilize and retain in a dispersed state, injected CO$_2$ gas which is used in lieu of the aluminum metal for gas generation. In the course of the test, more than one large bottle of carbon dioxide having a gauge pressure of 500 psi is injected into the slurry prior to placement, with no perceptible volume change being observable. The pressure at the bottom of the slurry column in the test cell falls to below 500 psi in 18 minutes, and drops to 85 psi in 40 minutes. From these results, it is concluded that the CO$_2$ is too soluble in the water in the slurry and/or too reactive with the Portland cement to constitute an effective gas generating material susceptible to addition to this slurry at the time of mixing. It should be noted, however, that premixing CO$_2$ with a high gypsum cement has been found to yield a slurry which can be effectively utilized to suppress gas invasion.

In Test 7, the cement utilized is Ciment Fondue which is non-Portland cement with a high tricalcium aluminate content. In the test, the pressure remains above 500 psi for over 18 hours.

EXAMPLE 9

A number of cement slurries are made up utilizing Portland cement, various set time retarding additives and various accelerators. The slurries also contain various materials incorporated in the slurries for the purpose of observing their gas generating potential. The slurries are placed in a test cell under 2000 psi pressure. The water jacket surrounding the test cell is heated to various temperatures ranging between 140° and 210° F. in the course of the tests.

During each test, the temperature inside the test cell is measured at periodic time intervals following pressurization of the test cell and commencing heat-up of the water circulating in the water jacket. At the times of temperature measurement, the percent by which the volume of the slurries has increased, if any, is measured, and this volumetric increase is then corrected for thermal expansion to determine the percent volume increase due to generated gas. At the termination of each test period, the compressibility of the tested slurry is measured, and the percent of gas generated as calculated from such compressibility is determined.

The results of these tests are set forth in Tables VIa and VIb.

TABLE VIa

| Material Tested[a] | Percent Slurry Volume Increase Due to Generated Gas | | | | | |
|---|---|---|---|---|---|---|
| | Zn-1 | Zn-2 | Ca Powder | Mg Powder | Al(Type C) | Zn-1 |
| Wt. Percent | 5.0 | 1.82 | 1.11 | 0.75 | 0.50 | 5.0 |
| Size, μm for 90%[b] | 20–170 | <10 | 10–150 | 20–170 | >15 | 20–170 |
| Test Slurry Type[c] | G | F | F | F | G | F |
| Retarder, % | 0.2 | 0.3 | 0 | 0 | 0 | 0.2 |
| Accelerator, % and Type | 2NaOH | 2NaOH | 0 | 2CaCl$_2$ | 2CaCl$_2$ | 2NaOH |
| Test Temperature, °F.[d] | 206 | 206 | 144 | 140 | 144 | 206 |

| | | Vol. % | °F. | Vol. % | °F. | Vol. % | °F. | Vol. % | °F. | Vol. % | °F. | Vol. % | °F. |
|---|---|---|---|---|---|---|---|---|---|---|---|---|---|
| Test Time, Minutes | 0 | 0 | 72 | 0 | 72 | 0 | 56 | 0 | 73 | 0 | 56 | 0 | 76 |
| | 1 | 0 | 75 | 0 | 84 | 0 | 63 | Not done | | 0 | 60 | 0 | 84 |
| | 5 | 0 | 86 | 0.05 | 100 | 0 | 77 | 0.3 | 88 | 1.1 | 72 | 0 | 112 |
| | 10 | 0 | 122 | 0.43 | 133 | 0 | 130 | 1.1 | 121 | 3.3 | 150 | 0 | 155 |
| | 20 | 0 | 139 | 0.30 | 192 | 1.1 | 144 | 2.2 | 140 | 4.5 | 158 | 0 | 212 |
| | 30 | 0.1 | 144 | 0.23 | 198 | 3.6 | 162 | 3.0 | 153 | 4.7 | 146 | 0 | 212 |
| | 60 | 0.1 | 191 | 0.28 | 208 | 4.8 | 150 | 3.5 | 148 | 4.8 | 145 | 0 | 212 |
| | 90 | 1.0 | 291 | 0.57 | 208 | — | — | 3.2 | 146 | — | — | 0 | 210 |
| Compressibility, μ/atm. (mins.) | | 79(90) | | 106(90) | | 369(60) | | 450(90) | | 420(65) | | 151(120) | |
| Percent Gas from Compressibility[e] | | 0.80 | | 1.10 | | 4.5 | | 5.2 | | 5.1 | | 2.6 | |

TABLE VIb

| Material Tested[a] | Percent Slurry Volume Increase Due to Generated Gas | | | | |
|---|---|---|---|---|---|
| | KBH$_4$ Powder | KBH$_4$ Powder | ZrOCL$_2$ | ZrCl$_4$ | CaC$_2$ |
| Wt. Percent | 0.75 | 0.75 | 6.0 | 2.0 | 0.59 |
| Particle Size | water soluble | water soluble | fine powder | fine powder | 10–20 mesh |
| Test Slurry Type[c] | F | F | F | F | F |
| Accelerator, % and Type | 0 | 2.0 CaCl$_2$ and 0.5 Na$_2$S$_2$O$_3$ | 0 | 0 | 0 |
| Test Temperature, °F.[d] | 206 | 144 | 206 | 144 | 144 |

| | | Vol. % | °F. | Vol. % | °F. | Vol. % | °F. | Vol. % | °F. | Vol. % | °F. |
|---|---|---|---|---|---|---|---|---|---|---|---|
| Test Time, Minutes | 0 | 0 | 56 | 0 | 71 | 0 | 60 | 0 | 96 | 0 | 78 |
| | 1 | 0 | — | 0 | 74 | 0 | 72 | 0 | 94 | 0 | 85 |
| | 5 | — | — | 0 | 82 | 0.5 | 94 | 0 | 95 | 0 | 86 |
| | 10 | — | — | 0 | 108 | 0.7 | 146 | 0 | 115 | 0 | 104 |
| | 20 | 1.9 | 184 | 0 | 137 | 1.2 | 182 | 0 | 137 | 0 | 132 |
| | 30 | 4.7 | 203 | 0 | 146 | 1.0 | 204 | 0 | 142 | 0 | 143 |
| | 60 | 11.2 | 209 | 0.4 | 150 | 0 | | | | 0 | 143 |
| | 80 | 13.1 | — | — | — | slurry set | | slurry set | | slurry set | |
| | 90 | — | — | — | — | | | | | | |
| | 120 | — | — | 3.6 | — | | | | | | |
| Compressibility, μ/atm (mins.) | | 920(80) | | 409(120) | | 20(40) | | 38.4(60) | | 25(30) | |
| Percent Gas from Compressibility[e] | | 12.0 | | 5.1 | | nil | | trace | | nil | |

Footnotes to Tables VIa and VIb
[a]The materials used are as follows:
Zn-1 = fine zinc powder.
Zn-2 = extra fine zinc powder; 90 weight percent less than 10 microns.
[b]Ninety weight percent of particles are sized in the indicated range.
[c]The types of slurries used are as follows:
F = Class H cement, 46% water and 1% of a commercially available fluid loss additive.
G = Class H cement, 48% water, 2% CaCl$_2$, 1% of a commercially available retarder.
[d]Circulating bath temperature for heating the test chamber.
[e]The volume percent of gas generated as calculated from measured compressibility.

EXAMPLE 10

Several of the materials tested for their gas generating property at 2000 psi pressure, as referred to in Example 9, are also tested at atmospheric pressure and a constant bath temperature of 140° F. In these tests, each slurry is made up using API Class H cement which contains 46 weight percent water and 1 weight percent of a commercially available fluid loss additive. The tests are carried out in a direct gas displacement device with one inch of water back pressure applied. Various amounts and types of accelerator additives are selectively added to the several slurries.

At periodic time intervals during the test, the amount of gas generated is determined. The amounts of gas generated and measured, as expressed in standard cubic feet of gas per cubic foot of slurry tested, are set forth in Table VII.

powder. The type of aluminum powder employed is that designated as Type B in Table II.

Thirteen barrels of water are pumped with the first plug, and the cement mixing is commenced. The top plug is dropped at 11:45 a.m. and is on the bottom at 12:45 p.m. In making up the cement, approximately 1600 sacks of cement are mixed with 200 barrels of fresh water containing the alcohol carrier and aluminum

TABLE VII

| Gas Generator & Amount | Generated Gas Volume (SCF) per Volume (CF) of Unreacted Slurry ||||||||||||||
|---|---|---|---|---|---|---|---|---|---|---|---|---|---|---|
| | Mg. Powder, 0.75% |||||| Zinc Granules, 1.82% |||| KBH$_4$ Fine Powder, 0.75% |||||
| Accelerator, Code[a] | 0 | 1 | 2 | 3 | 4 | 5 | 0 | 3 | 4 | 5 | 0 | 1 | 2 | 3 | 4 |
| Test Time, Mins.  1 | 0.1 | 0.3 | 0.2 | 0.1 | 0.1 | 0 | 0.4 | 0.1 | 0 | 0 | 0 | 0 | 0 | 0 | 0 |
| 5 | 0.4 | 2.2 | 0.8 | 1.3 | 0.6 | 0.6 | 0.6 | 0.7 | 0.3 | 0.3 | 0 | 0 | 0 | 0 | 1.7 |
| 10 | 0.9 | 2.9 | 1.1 | 2.5 | 1.5 | 0.2 | 0.7 | 0.7 | 0.6 | 0.7 | 0.1 | 0 | 0.1 | 0.5 | 2.5 |
| 20 | 0.9 | 6.4 | 1.3 | 3.4 | 1.9 | 0.5 | 0.9 | 0.7 | 0.7 | 1.1 | 0.2 | 0.8 | 0.1 | 1.1 | 3.3 |
| 30 | 0.9 | 7.0 | 1.4 | 4.3 | 2.3 | 0.5 | 0.9 | 0.7 | 0.7 | 1.2 | 0.3 | 0.8 | 0.1 | 1.7 | 4.0 |
| 60 | 0.9 | 7.8 | — | 5.6 | 4.4 | 0.5 | 0.9 | 0.7 | 0.8 | 1.3 | 0.9 | 0.8 | 0.1 | 3.4 | 6.6 |
| 75 | 0.9 | — | — | — | — | — | 0.9 | Not measured[b] |||| — | — | — | — | — |
| 120 | — | — | — | 8.1 | 4.7 | — | | Not measured ||| — | — | — | — | — |
| 1080 | | | Not measured ||||| Not measured ||| 9.4 | — | — | — | 13.8 |

| Gas Generator & Amount | Generated Gas Volume (SCF) per Volume (CF) of Unreacted Slurry |||||
|---|---|---|---|---|---|
| Accelerator, Code[a] | Ca Powder, 1.11% | Ca$_3$N$_2$ Granules, 1.02% | Fine Zinc Powder | CaC$_2$, 0.59% 10–20 Mesh | Very Fine ZrCl$_4$, 2.0% |
| | 0 | 0 | 0 | 0 | 0 |
| Test Time, Mins.  1 | 0.1 | 0.8 | — | 0.94 | 0.08 |
| 5 | 1.2 | 1.2 | 0.32 | 1.44 | 0.50 |
| 10 | 2.7 | 1.3 | 0.58 | 1.44 | 0.50 |
| 20 | 3.7 | 1.3 | 0.66 | 1.44 | 0.50 |
| 30 | 6.4 | 1.3 | 0.96 | 1.44 | 0.50 |
| 60 | 8.2 | 1.3 | 1.52 | 1.44 | 0.50 |
| 75 | — | — | — | — | — |
| 120 | 9.4 | — | — | — | — |

[a] 0 = no accelerator; 1 = 3% NaCl; 2 = 1% Na$_2$S$_2$O$_3$; 3 = 2% CaCl$_2$; 4 = 2% CaCl$_2$ and 0.5% Na$_2$S$_2$O$_3$, and 5 = 1% NaOH
[b] Blanks (—) indicate measurements not made at these times.

The data set forth in Tables VIa, VIb and VII demonstrate that a number of types of chemicals can be utilized for in situ gas generation, depending on the pressure which is imposed on the slurry at the placement situs in the well bore. Some of the materials tested do not perform well as gas generators at the 2000 psi pressure level, but do yield significant quantities of gas at atmospheric pressure.

EXAMPLE 11

In developmental field tests of the present invention, intermediate casings in two offshore wells in the Gulf of Mexico are cemented in accordance with the present invention. In efforts to complete six other wells off the same platform, gas leakage or invasion occurs following cementing with a conventional cement in which no gas is dispersed.

In one of the developmental field tests, the casing set is 9⅝ths inches in diameter, and the total vertical depth of the well is 5000 feet with a bottom hole circulating temperature (BHCT) of 90° F.

The cement slurry composition used is made up by mixing API Class H cement with 48 weight percent of fresh water, 0.75 weight percent of a commercially available fluid loss additive, 0.4 weight percent of a commercially available friction reducer-dispersant, 2.0 weight percent calcium chloride, 0.2 weight percent of a commercially available modified lignosulfonate retarder and 0.27 weight percent aluminum powder. Prior to mixing with the cement, the aluminum is mixed with enough ethylene glycol containining a small amount of a commercially available surfactant to produce a total volume of 4.5 gals. containing 10 lbs. of the aluminum metal to provide the specified concentration of aluminum metal in the cement. The slurry mixes without difficulty and no high viscosities are observed.

The overall cementing job is successful, and there is no gas flow to the surface via the cement-filled annulus in this well.

In the second well in which an intermediate casing is cemented by using the process of the invention, the top of the cement is brought to a measured depth of 3686 feet, with the bottom of the casing being at a measured depth of 8005 feet. In cementing this well, 1600 sacks of API Class H cement are used. The cement slurry contains 1 weight percent of a commercially available fluid loss additive, 2 weight percent calcium chloride, 0.25 percent of a commercially available de-aerating compound to reduce initial air entrainment in the cement, and 0.25 weight percent of fine aluminum powder. The water is added to the cement and other dry additives in an amount to yield cement having a density of 15.5 lbs./gal.

The weight of the mud displaced by the cement in the cementing operation is 13.2 lbs./gal. After completing placement of the cement, the casing seat is tested and found to be capable of holding the equivalent of a 17.7 lbs./gal. mud. This indicates excellent bonding and sealing of the cement to the casing and to the formation. No lost circulation is observed, and no gas flow to the surface is perceived to occur, even after a long observation period.

In a third well drilled from the same offshore platform as that used in drilling the two wells completed as described above by the cementing process of the present invention, an intermediate casing is cemented, with the top of the cement located at a measured depth of 3459 feet, and with the bottom of the casing at a measured depth of 8392 feet. In undertaking to cement this intermediate casing, 1826 sacks of a cement made up of a 50/50 mixture of pozzolan cement and API Class H cement are utilized. The aqueous slurry composition further contains 10 weight percent salt, 0.75 weight percent of a commercially available friction reducer and sea water mixed with the dry components to yield a slurry density of 14.5 lbs./gal.

After placement of this filler cement, the filler is tailed in with a cement constituted by 986 sacks of API Class H cement mixed with sea water to provide a slurry density of 16.0 lbs./gal. This slurry contains 10 weight percent salt and 0.75 weight percent of a commerically available friction reducer.

The weight of the mud displaced upon cementing is 13.2 lbs./gal. Prior to placement of the cement, the well is circulated until the mud is free of gas. Following cementing of the well, it is observed that gas commences to appear at the surface a period of 1 hour and 30 minutes following completion of the cement placement.

In another well drilled from the same platform, 1300 sacks of the same pozzolan-API Class H cement referred to above are placed in the annulus to cement an intermediate casing extending from a measured depth of 7690 feet. The filler cement is followed by 500 sacks of tailing in cement. The tailing in cement is API Class H cement mixed with sea water to provide a slurry density of 16.0 lbs./gal. The cement displaced mud, which is initially circulated until the return mud is free of gas, has a density of 13.1 lbs./gal. After completion of the cement placement, the well remains dead for 12 hours, and no lost circulation is observed. The casing is tested to 5000 psi and to a mud weight of 13.1 lbs./gal. before drilling out. 140 hours after completion of cementing, gas is observed at the surface after having passed through the cemented zone in the annulus.

In two other wells drilled from the same platform, efforts are made to cement intermediate casings using 15.6 lbs./gal. conventional sea water cement slurries containing no gas generating material. In the case of one of the wells, gas flow to the surface via the annulus is noted 1 hour after the cementing plug is bumped. In the second well, gas flows to the surface 35 minutes following the time that cementing is completed and the plug bumped.

Although the foregoing description of the invention has dealt with certain preferred cement compositions, including certain preferred gas generating components to be used in such compositions, it will be understood that variations in both the compositions of the cements, within the broad limits described, as well as in the steps carried out in practicing the process of the invention, can be effected without departure from the basic principles which underlie the invention. Changes in materials used and the steps followed which are of this type are therefore deemed to be within the spirit and scope of the invention except as the same may be necessarily limited by the appended claims and reasonable equivalents thereof.

What is claimed is:

1. An increased compressibility cement composition for sealing a subterranean zone penetrated by a bore hole having a portion pressurized by an adjacent gas source comprising an aqueous hydraulic cement, an effective amount of a gas generating agent for generating a stable volume of gas sufficient to increase the compressibility under such downhole conditions by at least 25% in relation to the initial compressibility of the same composition not containing said gas generating agent and at least 0.05 weight percent, based on dry cement, of a chemical fluid loss control additive.

2. A cement composition as defined in claim 1 wherein said gas generating agent is selected from the group consisting of particulate metals which yield hydrogen gas upon reaction with the aqueous hydraulic cement, calcium nitride, zirconyl chloride, zirconium tetrachloride, calcium carbide, and potassium borohydride or mixtures thereof.

3. A cement composition as defined in claim 2 wherein said gas generating agent is potassium borohydride.

4. A cement composition as defined in claim 1 wherein said fluid loss control additive is compatible with said gas generating agent and said aqueous hydraulic cement and effective to reduce the amount of fluid lost from the cement composition while in its sealing position and prior to set by at least 25 percent in comparison to the fluid lost when the composition does not contain said fluid loss control additive.

5. In an oil well hydraulic cement slurry composition of the type containing hydraulic cement and water, the improvement comprising increasing compressibility of said slurry by at least 25% in relation to the initial compressibility of the unimproved slurry via the inclusion in the cement of an effective amount of an entrained, stable volume of gas, such amount equivalent to at least 0.1 volume percent of the total volume of the slurry, and from about 0.05 to about 3.0 weight percent of a fluid loss control additive, based on the weight of the dry cement, said volume percent being based on the total slurry volume when the cement is in place in the well.

6. The improvement in an oil well hydraulic cement slurry defined in claim 5 wherein the entrained gas is hydrogen.

7. The improvement in an oil well hydraulic cement slurry defined in claim 5 wherein the entrained gas is nitrogen.

8. The improvement in an oil well hydraulic cement slurry defined in claim 5 wherein the entrained gas is oxygen.

9. The improvement in an oil well cement slurry defined in claim 5 wherein the entrained gas is a low molecular weight hydrocarbon.

10. An increased compressibility well cementing composition comprising:
   a hydraulic cement;
   water in an amount from about 20 to about 135 percent by weight of the dry hydraulic cement;
   a fluid loss control additive in an amount of about 0.05 to about 3.0 percent by weight of the dry cement;
   an accelerator gel-preventing material in an amount of from about 0.1 to about 10 percent by weight of the dry cement; and
   from about at least 0.1 volume percent of a stable volume of gas under actual downhole conditions, such amount effective to increase the compressibility under such downhole conditions by at least 25% in relation to the initial compressibility of the same composition not containing said gas and accelerator gel-preventing material, and where said gas is dispersed in the composition and is compatible with the remaining components of the composition.

11. A well cementing composition as defined in claim 10 wherein said gel-preventing material is calcium chloride.

12. A well cementing composition as defined in claim 10 wherein said hydraulic cement is a cement selected from the class consisting of Portland cements, pozzolan cements, gypsum cements and high alumina cements.

13. A well cementing composition as defined in claim 12 wherein said hydraulic cement is Portland cement.

14. A well cementing composition as defined in claim 13 wherein said Portland cement is a cement of the type defined by API Specification 10-A.

15. A well cementing composition as defined in claim 10 wherein said fluid loss control additive is selected from the group consisting of modified polysaccharides, polymerized aromatic sulfonates and mixtures thereof.

16. A well cementing composition as defined in claim 10 wherein said gas is hydrogen.

17. A well cementing composition as defined in claim 16 wherein said hydraulic cement is Portland cement.

18. A well cementing composition as defined in claim 17 wherein said gel-preventing material is selected from the group consisting of alkali metal halides and alkaline earth metal halides.

19. A well cementing composition as defined in claim 18 wherein said gel-preventing material is calcium chloride.

20. A compressible well cement composition for cementing an oil and gas well comprising:
a hydraulic cement:
water in an amount of from about 35 to about 50 percent by weight of the cement;
a fluid loss control additive in an effective amount to reduce the amount of fluid lost from the cement composition while in its sealing position and prior to set by at least 25 percent in comparison to the fluid lost when the composition does not contain said fluid loss control additive of from about 0.05 to about 2.0 percent by weight of the dry cement; and
aluminum powder in an effective amount to generate a stable volume of a cement compatible gas under actual downhole conditions of from about 0.1 to about 5.0 percent by weight of cement.

* * * * *